(No Model.)
E. J. M. CLEMENS.
WATER PURIFER.
No. 514,617.
Patented Feb. 13, 1894.
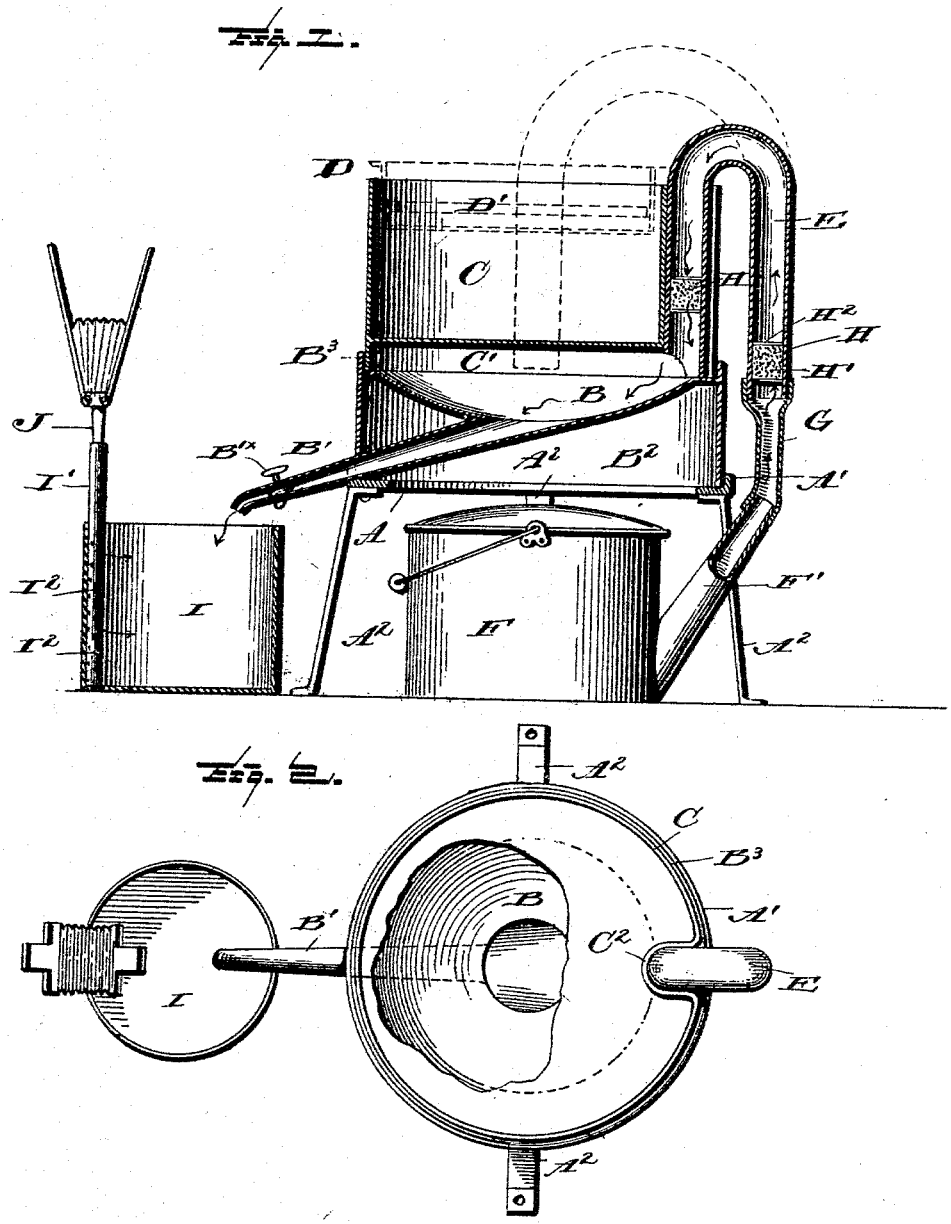
Witnesses:
L. C. Hills.
Heath Sutherland
Inventor:
Eliza J. M. Clemens.
By E. B. Stocking
Attorney

UNITED STATES PATENT OFFICE.

ELIZA J. M. CLEMENS, OF METROPOLIS, ILLINOIS.

WATER-PURIFIER.

SPECIFICATION forming part of Letters Patent No. 514,617, dated February 13, 1894.

Application filed April 29, 1893. Serial No. 472,339. (No model.)

*To all whom it may concern:*

Be it known that I, ELIZA J. M. CLEMENS, a citizen of the United States, residing at Metropolis, in the county of Massac, State of Illinois, have invented certain new and useful Improvements in Water-Purifiers, of which the following is a specification, reference being had therein to the accompanying drawings.

This invention has relation to an apparatus for purifying water which apparatus is designed with a view to secure efficiency, rapidity of operation, minimum number of parts and simplicity in its operation, whereby it is adapted for domestic purposes and for successful use by unskilled persons.

The invention is also possessed of means for filtering, deodorizing, aerating and preliminarily heating the water to be purified.

Other objects and advantages will appear in the following description and the novel features thereof will be particularly pointed out in the claims.

Referring to the drawings: Figure 1 is a substantially, central vertical section, and Fig. 2 a plan of a water purifying apparatus constructed in accordance with my invention.

Like letters refer to like parts in both figures.

Upon a suitable support A which may consist of an annular ring with or without a flange A' and with legs $A^2$, a condensing pan B is arranged having an outlet B' communicating with the lowest point of the bottom of the pan and having a depending flange $B^2$ or other suitable means for supporting the same upon a base which flange may fit within the flange A' of the said base. The condensing pan may also be provided with an upwardly-extending flange $B^3$ within which the depending flange C' of a cold-water reservoir C may fit and rest upon a portion of the bottom of the condensing pan. The reservoir may be covered by a filtering pan, as shown by dotted lines in Fig. 1 which with the filtering bed D' may be of any usual or desired construction. A bent tube E is provided with one leg communicating with the condensing pan D and with its remaining leg projecting outside of the apparatus. The communication with the condensing pan by means of the bent-tube may be through the center of the reservoir and of the filter when employed as indicated by dotted lines Fig. 1, but in cheaper constructions an exterior passage for the tube is formed in the reservoir by curving its vertical wall inwardly as shown at $C^2$, Fig. 2, and making the bottom to conform thereto.

Beneath the support A any suitable steam producing apparatus F, for example an ordinary tea-kettle is placed while the apparatus is upon or above any suitable heater, such as a stove. From the spout F' of the kettle to the bent tube E there extends a connection G which may be a rubber or other pipe which is fitted steam-tight with the kettle and with the tube.

With the apparatus thus far described water may be passed from the filtering pan through the filter bed into the reservoir which will cleanse it from ordinary mechanical impurities. Filtered or unfiltered water may be converted into steam by the kettle F and the steam will rise through the connection into the bent tube and as it falls through the other leg of said tube which is in contact with the wall of the reservoir, it will by reason of the cold water therein be condensed and will fall into the condensing pan and from thence pass through the outlet B' which may or may not be provided with a valve $B'^x$ and from thence as desired into any suitable receptacle. Any steam which may pass into the condensing pan will rise into contact with the bottom of the cold water reservoir and be condensed. For deodorizing and further purification of the water filtering plugs H, one or more may be inserted in the bent tube.

The filtering plugs consist of a textile sack or bag containing animal charcoal or any other suitable means for the purpose or the said means or material H' may be retained by disks $H^2$ of reticulated or perforated material. A plug may be inserted at one end only or at both ends of the tube as shown. The steam in passing through these plugs is purified more perfectly than the passage of water therethrough by reason of the much finer subdivision of the particles and the higher degree of heat.

I represents a receptacle for receiving the distilled water which is adapted for its aeration. Within the receptacle I there is a tube I' having numerous perforations I² and the upper end of the tube receives the nozzle of any suitable air pressure apparatus, for example an ordinary domestic bellows J whereby air may be forced through the distilled water.

It is apparent that the entire apparatus is of simple construction, arrangement and operation and that it may be altered in many details and appurtenances added thereto and the invention is therefore not limited to the exact construction shown and described as the latter is but an illustration of many different forms which may be employed to attain the ends of the invention.

It is apparent that the employment of the filter D D' enables the user to fill the steam-producer F with clean water which has been partially heated in the process of condensing the steam in the steam tube E. It is also apparent that the plugs H may consist of sponge impregnated with any suitable deodorizing, disinfecting or purifying chemical or substance.

What I claim is—

1. In an apparatus of the class described, the combination with a support and a condensing pan having a discharge pipe with a cock, of a reservoir removably supported thereon and having a passage therethrough, a condensing pan supported upon said reservoir and a bent tube connected with the lower condensing pan, with one leg in the passage of the reservoir and a flexible pipe on the other end of said tube, substantially as specified.

2. In an apparatus of the class described, the combination with a support and a condensing pan having a discharge pipe with a cock, of a reservoir removably supported thereon and having a passage therethrough, a condensing pan supported upon said reservoir, a bent tube connected with the lower condensing pan, with one leg in the passage of the reservoir and a flexible pipe on the other end of said tube and permeable plugs of purifying material in the legs of said tube, substantially as specified.

3. The combination with a suitable support, of a condensing pan having a concave bottom and a discharge pipe communicating with the lowest point of the bottom and having a downwardly-disposed pan-supporting flange and an upwardly-disposed flange, a cooling reservoir adapted to fit within the upwardly projecting flange of the condensing pan and having a vertical passage communicating with the condensing pan and a removable bent tube adapted to rest in said passage and upon the condensing pan, substantially as specified.

In testimony whereof I affix my signature in presence of two witnesses.

ELIZA J. M. CLEMENS.

Witnesses:
HEATH SUTHERLAND,
L. C. HILLS.